US012284402B1

(12) United States Patent
Hartshorn et al.

(10) Patent No.: US 12,284,402 B1
(45) Date of Patent: Apr. 22, 2025

(54) SYSTEM AND METHOD FOR GENERATING AND EVALUATING SYNTHETIC VIDEO SCENARIOS

(71) Applicant: UIPCO, LLC, San Antonio, TX (US)

(72) Inventors: Joel S. Hartshorn, Port Orchard, WA (US); Mark Paxman Warnick, San Antonio, TX (US); Will Kerns Maney, Jr., New York City, NY (US); Elena Marie Carrasco, Converse, NY (US); Sumita T. Jonak, San Antonio, TX (US); Ravi Durairaj, San Antonio, TX (US); Nolan Serrao, Plano, TX (US); Nathan Lee Post, Rockport, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/822,882

(22) Filed: Aug. 29, 2022

Related U.S. Application Data

(60) Provisional application No. 63/238,854, filed on Aug. 31, 2021.

(51) Int. Cl.
*H04N 21/234* (2011.01)
*H04N 21/8352* (2011.01)

(52) U.S. Cl.
CPC ... *H04N 21/23418* (2013.01); *H04N 21/8352* (2013.01)

(58) Field of Classification Search
CPC .............. H04N 21/23418; H04N 21/8352
See application file for complete search history.

(56) References Cited

U.S. PATENT DOCUMENTS

| | | | | |
|---|---|---|---|---|
| 11,501,079 | B1* | 11/2022 | Watson | G06N 3/088 |
| 2010/0304720 | A1* | 12/2010 | Lucero | H04N 23/635 |
| | | | | 455/414.1 |
| 2012/0284625 | A1* | 11/2012 | Kalish | G11B 27/034 |
| | | | | 715/723 |
| 2017/0351922 | A1* | 12/2017 | Campbell | H04N 19/37 |
| 2018/0322680 | A1* | 11/2018 | McElmurray | G06V 20/40 |
| 2019/0156149 | A1* | 5/2019 | Lerer | G06N 3/08 |
| 2019/0205667 | A1* | 7/2019 | Avidan | G08G 1/165 |
| 2020/0160502 | A1* | 5/2020 | Nießner | G06V 10/431 |

* cited by examiner

*Primary Examiner* — Kyu Chae
(74) *Attorney, Agent, or Firm* — Plumsea Law Group, LLC (57) ABSTRACT

Systems and methods that can automatically generate synthetic videos depicting alternative scenarios that may be consistent with recorded video. Systems and methods leverage machine learning systems that can generate synthetic video information using autoencoders and generative adversarial networks that have been trained on previous video data. Systems and methods further include a scenario dashboard that allows users of the system to select recorded videos and other settings that serve as inputs, or constraints, on the synthetically generated videos.

20 Claims, 7 Drawing Sheets

SYSTEM AND METHOD FOR GENERATING AND EVALUATING SYNTHETIC VIDEO SCENARIOS

CROSS-REFERENCE TO RELATED APPLICATIONS

This application claims the benefit of Provisional Patent Application No. 62/238,854 filed Aug. 31, 2021, and titled "System and Method for Generating and Evaluating Synthetic Video Scenarios," which is incorporated by reference herein in its entirety.

BACKGROUND

Security cameras are becoming ubiquitous in modern life, with increased numbers of Internet of Things (IoT) devices that can capture images and video being used to help monitor homes, vehicles, businesses, and public spaces. However, even with many more video cameras available, only dedicated security cameras may generally provide consistent monitoring of a given area. Moreover, even when multiple dedicated security cameras are present in a given physical space, there are often areas that are not directly viewable by the cameras.

There is a need in the art for a system and method that addresses the shortcomings discussed above.

SUMMARY

In some aspects, the techniques described herein relate to a method for generating and evaluating synthetic video scenarios based on captured on video, the method including: receiving video information; receiving a set of scenario settings; and generating synthetic video scenarios using the received video information and using the set of scenario settings.

In some aspects, the techniques described herein relate to a non-transitory computer-readable medium storing software including instructions that are executable by one or more device processors to generate and evaluate synthetic video scenarios based on captured on video by: receiving video information; receiving a set of scenario settings; and generating synthetic video scenarios using the received video information and using the set of scenario settings.

In some aspects, the techniques described herein relate to a system for generating and evaluating synthetic video scenarios based on captured on video, the system including: a device processor; and a non-transitory computer readable medium storing instructions that are executable by the device processor to: receive video information; receive a set of scenario settings; and generate synthetic video scenarios using the received video information and using the set of scenario settings.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide systems and methods that can automatically generate synthetic videos depicting alternative scenarios that may be consistent with recorded video. The exemplary systems and methods leverage machine learning systems that can generate synthetic video information using autoencoders and generative adversarial networks that have been trained on previous video data. The exemplary systems and methods further include a scenario dashboard that allows users of the system to select recorded videos and other settings that serve as inputs, or constraints, on the synthetically generated videos. The exemplary systems and methods can also include features for identifying when additional recorded video is required to generate a realistic synthetic video, and to automatically guide a user to locations where the user can film additional video.

Figure 1:
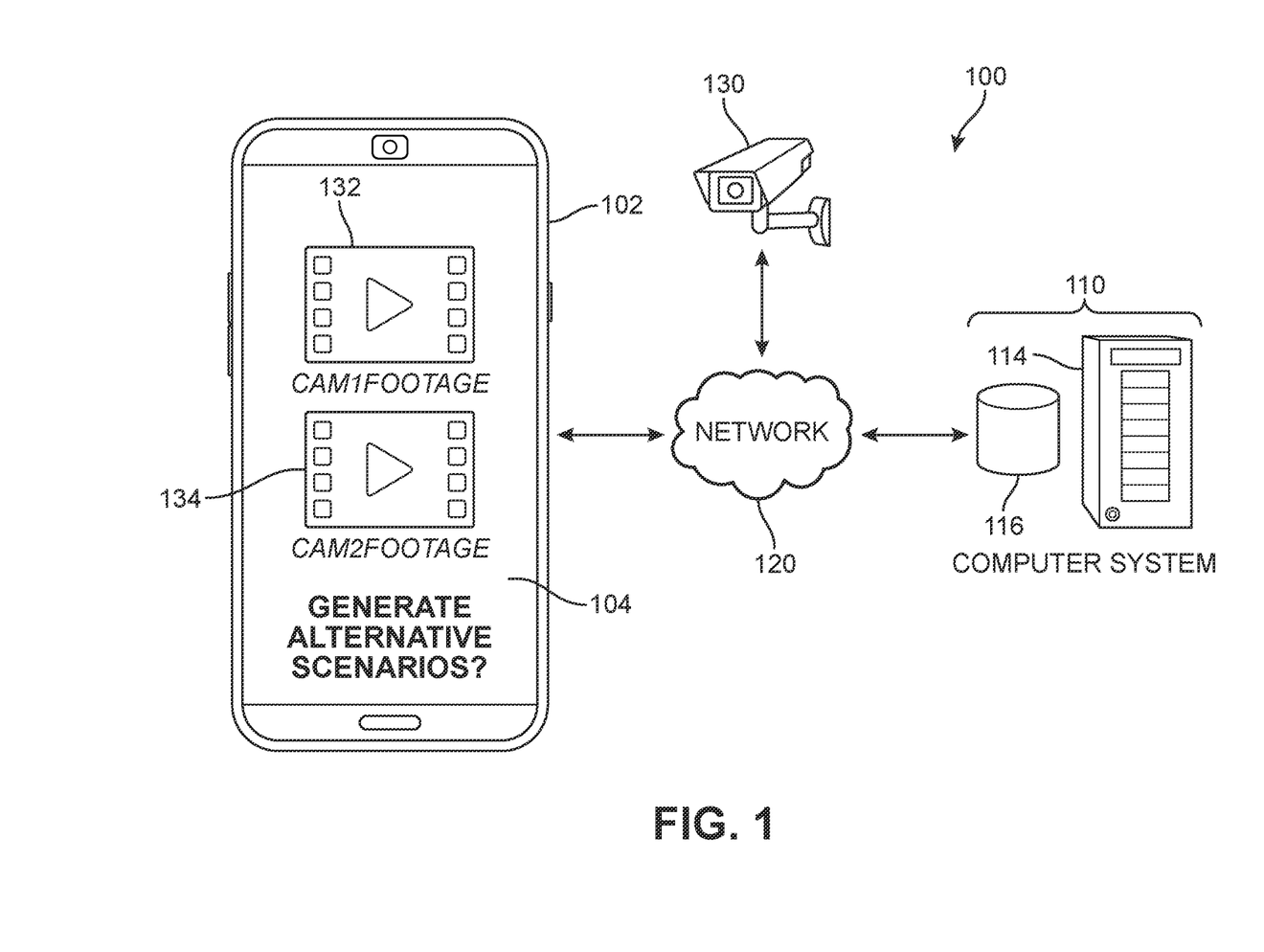
FIG. 1 is a schematic view of an embodiment of an architecture for generating synthetic video scenarios consistent with captured video footage.

FIG. 1 is a schematic view of an architecture for generating synthetic video scenarios when existing video evidence is incomplete and there may be competing interpretations of what happened before and/or after a recorded video scene. Such an architecture could be especially useful for police officers, security companies, insurance adjusters, or individual users who are trying to determine what has occurred based on reviewing snippets of video footage from security cameras and/or other video enabled IoT devices.

In one embodiment, a user may have a mobile device 102 (such as a smartphone) that can run a video scenario generation and evaluation application 104 ("application 104"). A mobile device can comprise processors and memory for running one or more mobile applications, such as application 104. Additionally, a mobile device may include a camera, microphone, and/or other features that can be used to capture video and/or audio recordings. Although the example of FIG. 1 depicts using a mobile phone to run synthetic video generating and evaluation software, in other embodiments, this software could be run on any other suitable computing system, such as a tablet, laptop, desktop computer or other suitable system.

In some cases, application 104 comprises the front-end of a software system, with a backend residing on a remote computer system 110. Computer system 110 could comprise one or more servers or other computing devices. Computer system 110 can include a computing device 114, which may further include processors and memory storing instructions that can be executed by the processors. Specifically, the memory could be a non-transitory computer-readable medium storing instructions that can be executed by one or more processors. Computer system 110 may also include data storage 116, which may provide long term data storage. In some cases, data storage 116 comprises a database that is implemented on suitable hardware.

Components of the software system running on computer system 110 may communicate with application 104 (and device 102) over network 120.

In other embodiments, application 104 may be a stand-alone software application that does not communicate with remote systems. Instead, application 104 could include all the necessary software components that might otherwise be stored and run on a remote computer system.

Application 104 may make use of video data, such as video files downloaded from one or more security cameras 130. In the exemplary embodiment, application 104 displays a first video segment 132 and a second video segment 134, which have been downloaded or otherwise retrieved from security cameras 130. In this case, upon receiving one or more videos, a user may be prompted to generate (or simulate) alternative scenarios.

For purposes of clarity, the term "synthetic video" refers to a video, or video information, that has been synthetically created by a computing device, rather than recorded (or captured) using a camera. A synthetic video may share information with a recorded video, but may be altered in some way to create a distinct video. The term "synthetic video scenario" refers to synthetic videos that show a possible scenario, or sequence of activity, that is consistent with various endpoints or other constraints. For example, the embodiments refer to exemplary synthetic video scenarios that comprise recorded video segments as endpoints, but whose intermediate segments are synthetically created. That is, the synthetic video segments "fill in" the details of what may have happened between the events captured in the recorded video endpoints. As described in further detail below, generating synthetic video scenarios may allow a user to evaluate the likelihood that a particular sequence of activity occurred. Additionally, as also described in further detail below, synthetic video scenarios can also be automatically analyzed by an autonomous synthetic video scenario evaluator, which can be trained to distinguish between plausible and implausible video scenarios.

Figure 2:
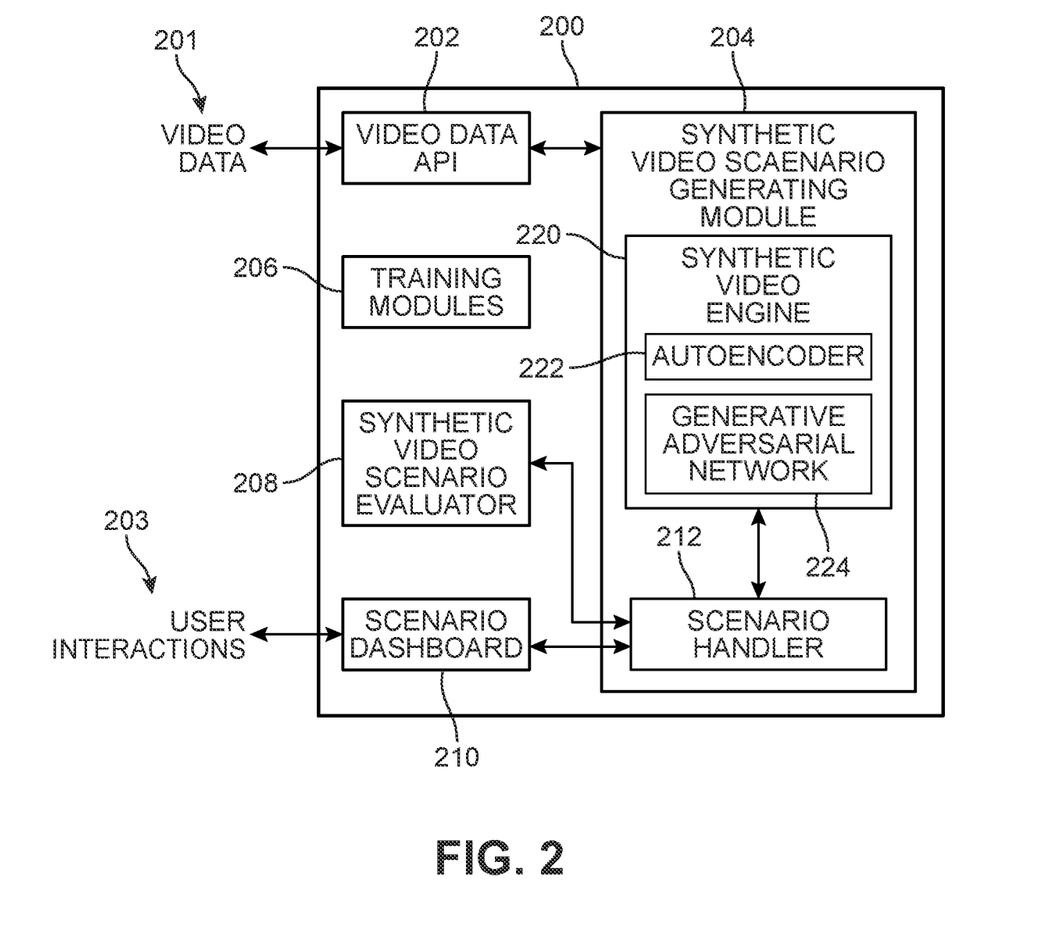
FIG. 2 is a schematic view of an architecture for generating synthetic video scenarios, according to an embodiment.

FIG. 2 is a schematic view of one possible architecture for a system 200 that can generate synthetic video scenarios and also autonomously evaluate those synthetic scenarios. System 200 may comprise a software application, and/or a subprogram or process associated with a software application.

Referring to FIG. 2, system 200 may comprise a video data API (application programming interface) 202 for receiving/retrieving video data 201. In some cases, video data could be video footage obtained from a security camera, mobile phone, or other device.

System 200 may also include a synthetic video scenario generating module 204 ("generating module 204"). Generating module 204 can include a synthetic video engine 220 that generates synthetic videos. In some embodiments, synthetic video engine 220 comprises machine learning systems, such as an autoencoder 222 and a generative adversarial network 224 ("GAN 224").

System 200 can also include a scenario dashboard 210 that allows users to control various aspects of the process of generating synthetic video scenarios. System 200 may receive user interactions 203 (which may include user selected settings) through scenario dashboard 210.

Information from scenario dashboard 210 can be passed to a scenario handler 212 of generating module 204. Whereas synthetic video engine 220 comprises the core functionality to generate synthetic videos, scenario handler 212 may include functionality for adjusting parameters of synthetic video engine, as well as for managing and storing information about different scenarios.

Scenario handler 212 may also pass synthetic video scenario information back to scenario dashboard 210.

Some embodiments of system 200 may include a synthetic video scenario evaluator 208 ("scenario evaluator 208"). Scenario evaluator 208 may a machine learning system that is trained to autonomously analyze and evaluate synthetic video scenarios.

Some embodiments of system 200 may also include one or more training modules 206, which may be used in training various machine learning components of the system. Alternatively, in some cases, training modules could be maintained externally to system 200.

Figure 3:
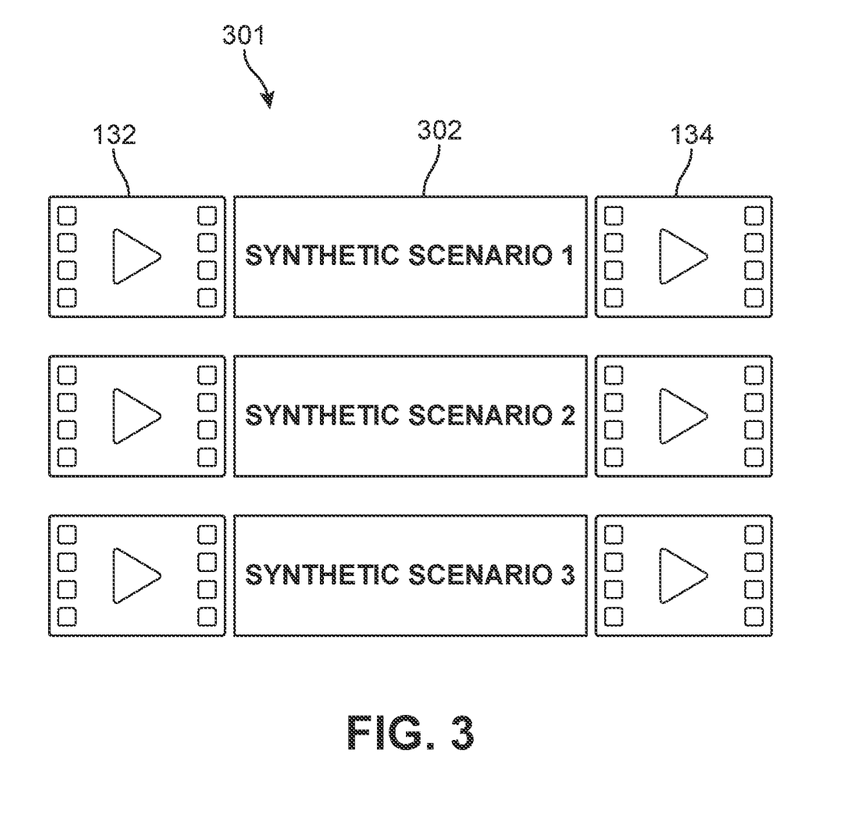
FIG. 3 is a schematic view of three different synthetic video scenarios generated according to an embodiment.

FIG. 3 is a schematic view of a set of three synthetic video scenarios, which have been labeled in FIG. 3 as "synthetic scenario 1", "synthetic scenario 2", and "synthetic scenario 3". As indicated schematically in FIG. 3, each synthetic video scenario in this example has as its endpoints recorded video segments. For example, a first synthetic video scenario 301 includes first video segment 132 and second video segment 134 at its beginning and end, respectively. In addition, each synthetic video scenario includes a synthetically generated video segment. For example, first synthetic video scenario 301 includes a synthetic video segment 302. Moreover, each of the different video segments of FIG. 3 have synthetic video segments that are different. Therefore, each synthetic video scenario is representative of one of three possible "scenarios" or "sequences of events" consistent with the recorded video segments at the scenario endpoints.

To clarify the discussion of FIG. 3, an exemplary situation is described. Consider a situation where video segments from two security cameras at opposite ends of an alley are retrieved. The video segments show a potential robbery suspect passing by the first camera as the suspect enters the alley at one end and passing by the second camera as the suspect exits the alley at the other end. Taken together, the video footage shows what the suspect was doing at the two ends of the alley, but not what the suspect was doing when moving between the two ends (since this part of the alley was not captured by either camera). The exemplary system provides a way for a user, such as a police detective, or other user, to generate alternative scenarios for what could have happened while the suspect was in the alley. For example, did the suspect simply run through the alley? Did the suspect stop and drop stolen items somewhere in the alley?

By leveraging synthetic video generation, the system can help create realistic videos of these different scenarios. In some cases, the system helps a user identify which scenarios may be most plausible. In the example of the suspect in an alley, the system could automatically generate synthetic video scenarios where the suspect stops and hides potentially stolen items, and the users of the system could review the synthetic video scenarios to determine if it is plausible that the suspect did hide stolen items in the alley. Here plausibility could be determined by observing the path taken by the suspect, their speed of motion, and so on. It may be that the system generates synthetic videos for some actions that are not plausible given how quickly the activities are performed in the synthetic video scenarios, for example.

Figure 4:
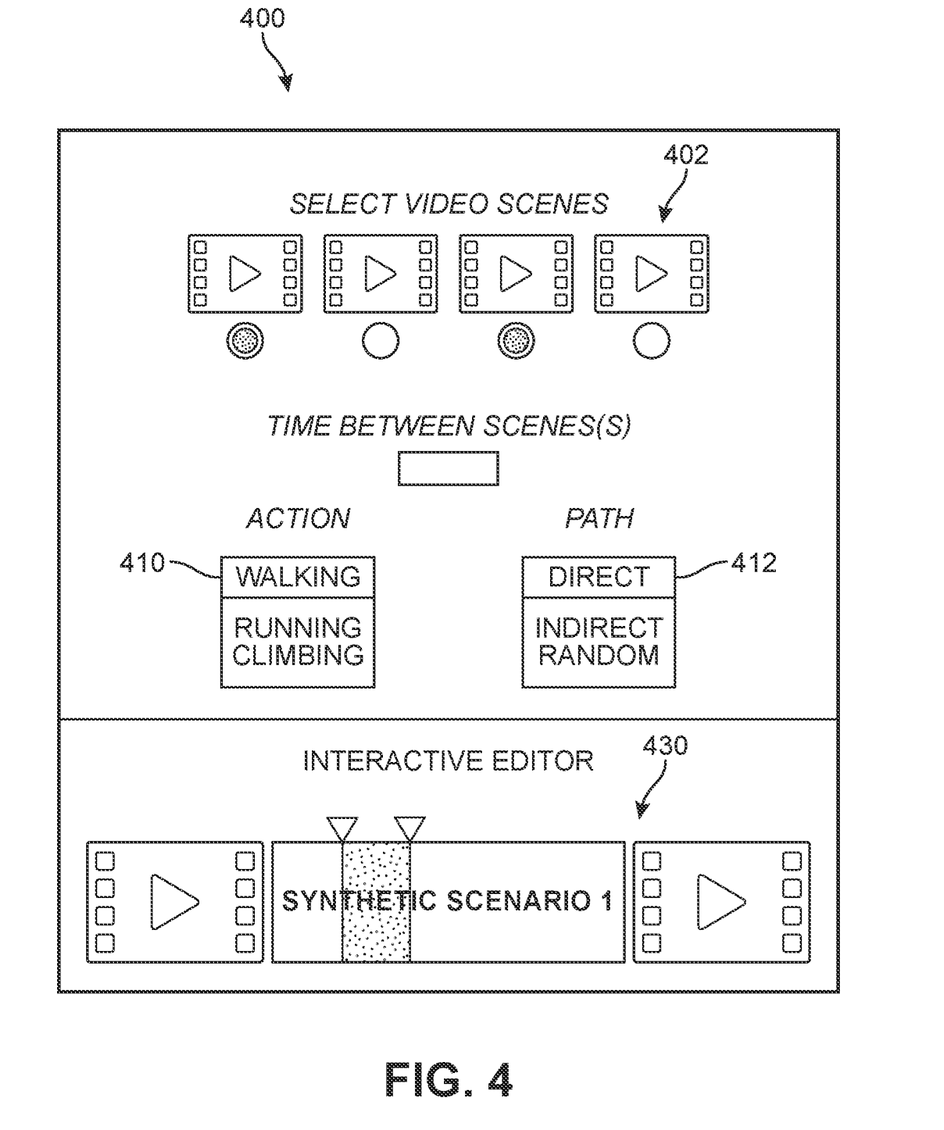
FIG. 4 is a schematic view of a scenario dashboard, according to an embodiment.

FIG. 4 is a schematic view of a scenario dashboard 400 ("dashboard 400") that may allow a user to define particular constraints for generating synthetic video scenarios. These constraints may be referred to as "scenario settings." Dashboard 400 may include a video selection portion 402 that allows a user to select a set of videos to be used in generating the synthetic video scenarios. It can also be appreciated that in some cases users could upload photos. In some cases photos, when used in conjunction with videos, could provide static endpoints, or intermediate points, for synthetically generated video scenarios that help in further constraining the possible scenarios.

Although not shown in FIG. 4, in some cases, video selection portion 402 can include features that allow a user to select the sequence of videos as well as whether to generate synthetic video segments before or after the recorded segments. For example, in another embodiment, a user could select a single recorded video segment and select options, via the dashboard, to generate synthetic video sequences at the beginning and at the end of the recorded video segment. Other options include indicating a length of a synthetic video segment to be generated between recorded video segments (input field 404).

Dashboard 400 may include options for selecting the type of action to be taken by the subject in a synthetic video using action menu 410. For example, in the above scenario where a suspect is recorded on video at opposite ends of the alley, a user could select "walking" to have the system generate synthetic video segments that show the suspect walking through the alley, or "running" to show the suspect running through the alley. By generating different scenarios and observing the resulting synthetic footage, the system can help users identify the most likely, or most plausible, actions taken by the potential suspect.

Dashboard 400 may also include options for selecting a particular path taken by a subject through a scene using path menu 412. For example, in a scenario where a subject is walking through an open area captured by a recorded video segment, a user could select different options for the subject's path between different endpoints (for example, between different endpoints captured in recorded video segments). Exemplary options could include taking a direct path, an indirect path or a random path. In still other cases, the system could include options for allowing a user to define a particular path. For example, in another embodiment, the system could display one or more still images from the recorded video segments and a user could trace a desired path for the subject directly onto the image.

Dashboard 400 may also include provisions that allow users to select portions of a synthetic scenario as it is generated. In the embodiment of FIG. 4, dashboard 400 may include an interactive editor 430. Using interactive video editor 430, a user could highlight particular portions of the synthetic video scenario in order to perform further actions like locking that portion in place, deleting the portion, or duplicating the portion.

The dashboard shown in FIG. 4 is only intended as one example of a possible user interface that allows a user to control aspects of the synthetically generated video scenarios. In other embodiments, a dashboard could be configured with any other suitable features.

It may be appreciated that in some embodiments, a system can autonomously evaluate different synthetic video scenarios without direct input from users. In particular, the synthetic video scenarios generated by the system may be considered as particular representations of data that can be generated using video data and non-video data as inputs. The system can use machine learning methods to classify the representations using a metric relevant to the representation space. In this context, one suitable representation space is the space of all possible synthetic videos, and a suitable metric would be a function that maps a given video sequence to classes such as "plausible" and "implausible." Moreover, the system could be trained to identify plausible and implausible scenarios, where plausible scenarios may be scenarios in which subjects move and behave in ways consistent with the laws of physics, biomechanics and basic principles of psychology. Such constraints would be implicitly learned by the system as it is trained on what are in fact "plausible" and "implausible" scenarios.

Figure 5:
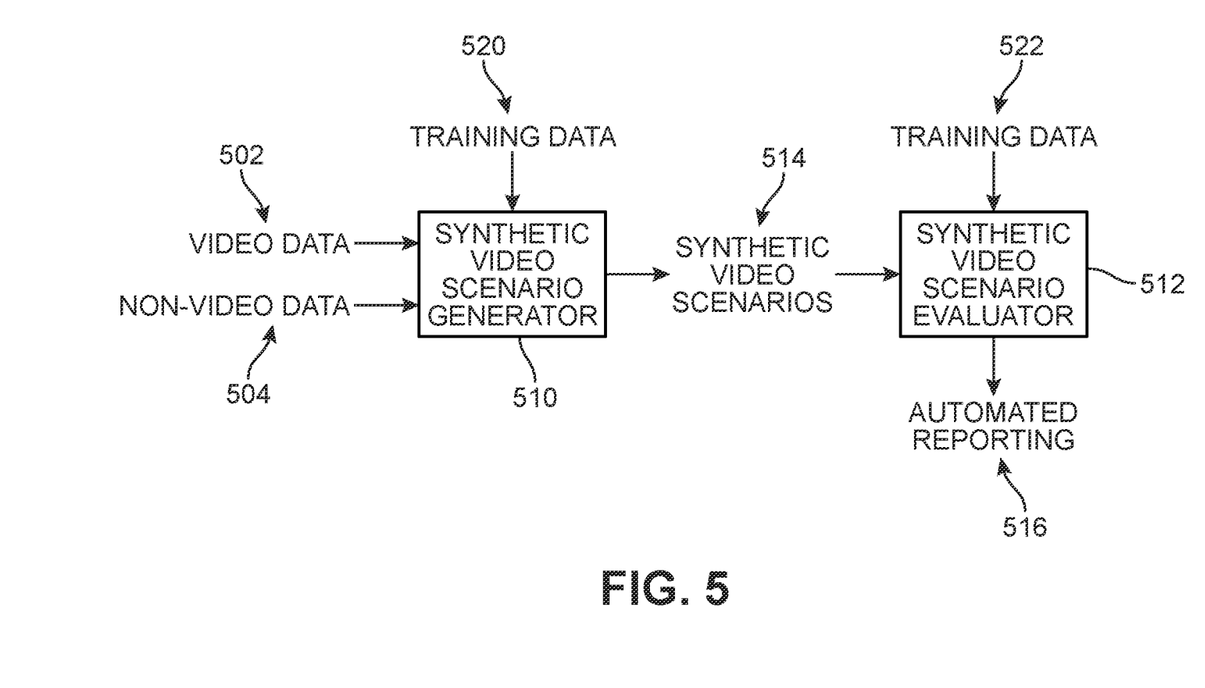
FIG. 5 is a schematic view of an architecture for automatically generating and evaluating synthetic video scenarios.

FIG. 5 is a schematic view of an architecture for a system that can generate synthetic video scenarios and then autonomously evaluate the scenarios for plausibility or other features. Referring to FIG. 5, in one embodiment video data 502 and non-video data 504 (such as scenario dashboard settings) may be fed into a synthetic video scenario generator 510 ("generator 510"). Generator 510 may produce synthetic video scenarios 514, which are then used as input to synthetic video scenario evaluator 512 ("evaluator 512"). In some cases, evaluator 512 can generate automated reporting 516 or other suitable outputs. This reporting could be delivered to relevant end users, such as insurance adjusters, police officers, or other suitable users.

In some embodiments, both generator 510 and evaluator 512 can comprise machine learning algorithms that can be trained using training data 520 and training data 522, respectively. In embodiments using a synthetic video scenario evaluator, the evaluator could be trained to detect behaviors that are plausible or implausible, based on feedback from external users (or from labeled training data) during the training experience. Because synthetic videos provide a different possible representation of input data (which may include recorded video as well as various constrains and settings), it is possible that the system could detect features in the synthetic video it has generated that may be undetected using other representations of the input data. In particular, the embodiment of FIG. 5 provides a broadly applicable method of testing models of the input data to more readily obtain a list of plausible scenarios.

Figure 6:
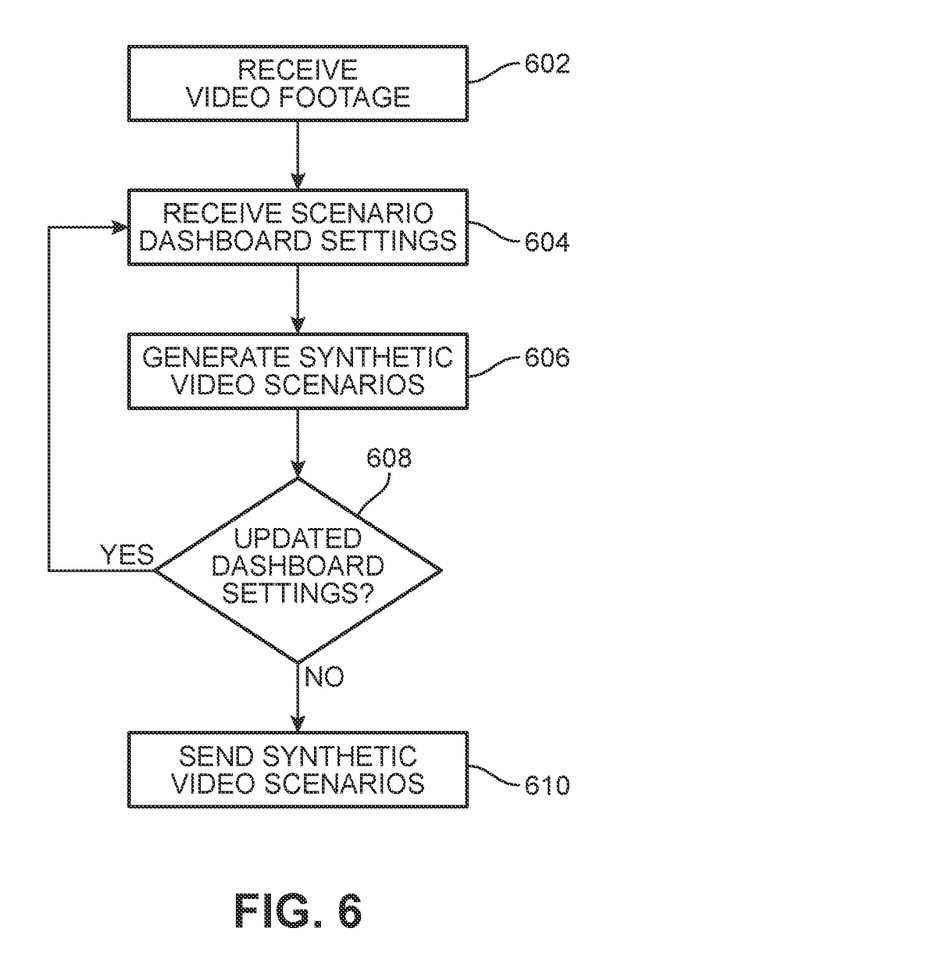
FIG. 6 is a schematic view of a method for generating synthetic video scenarios.

FIG. 6 is an example of a process for generating synthetic video scenarios, according to an embodiment. Starting in step 602, the system may receive video footage. In step 604, the system can receive scenario dashboard settings. Then, in step 606, the system can generate synthetic video scenarios.

In step 608, the system can check to see if any updates have been made to the dashboard settings in response to the most recently generated synthetic video scenarios. If changes have been made, the system can return to step 604 to receive the new dashboard settings. Otherwise, the system proceeds to step 610, where the synthetic video scenarios can be sent to another system, component, module, or user. These could include insurance adjusters, police officers, or other suitable end users.

In some cases, there may be insufficient video data to generate realistic synthetic video scenarios. In such cases, the system could be designed to automatically guide users to locations to film additional video that can be used as supplementary data.

Figure 7:
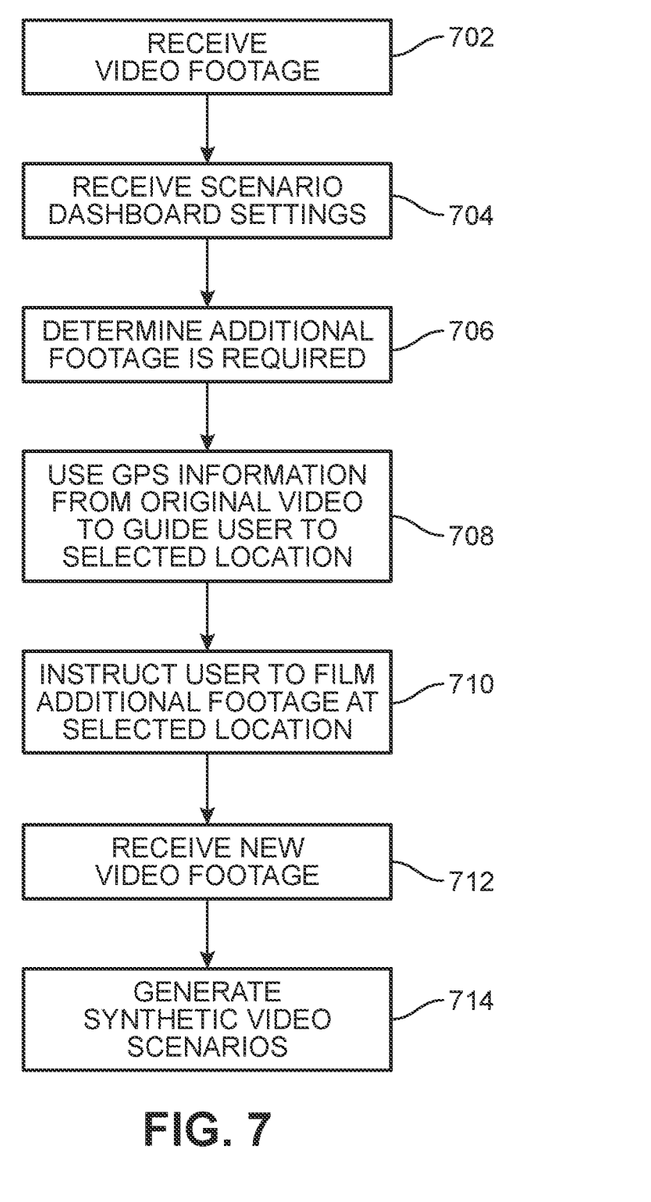
FIG. 7 is a schematic view of a method for guiding a user to obtain additional video footage to assist in generating synthetic video scenarios.

FIG. 7 is an example of a process for guiding a user to capture additional video to facilitate generation of a synthetic video scenario. In step 702, the system may receive video footage and in step 704 the system may receive scenario dashboard settings. In step 706, the system could determine that additional footage is required to generate synthetic video sequences according to a given set of constraints. In some cases, the system can make this determination through a learned process. For example, using a synthetic video scenario evaluator, the system could classify synthetic video scenarios as not only "plausible," and "implausible," but also as "incomplete." For incomplete classifications, the system could have predetermined actions to acquire additional video footage.

In step 708, the system uses GPS (or other location-based) information that may be retrieved from the original video footage. In many cases, digital video recordings and images store not only timestamp information but also location information. Using this GPS information the system can guide the user to a selected location. At the selected location, the system can instruct the user to film additional footage in step 710. That is, the system may provide guided instructions for a user to capture additional video at the selected location. In step 712, the system may receive the new footage and use it to help generate synthetic video scenarios in step 714. In some cases, this process can be repeated until the generated videos are no longer classified as "incomplete" by the evaluator.

To help clarify the principles of the exemplary systems and methods, consider a situation in which a car accident has occurred. In this example, two vehicles have collided. Video of the vehicles immediately prior to the accident has been obtained from a nearby street camera. Photos of the vehicle immediately following the accident have also been captured. However, no video or photographic evidence of the actual accident is available. Moreover, the drivers of each vehicle have different accounts of what occurred during the accident, and of who is ultimately at fault.

To facilitate reconstructing the most plausible scenarios for the accident, and in doing so helping to establish liability, the exemplary systems and methods described above could be used. The captured video could be uploaded to a suitable device running the synthetic video generating software. In addition, the user could upload photos of the final accident scene. Using a scenario dashboard, a user could select the video capturing the vehicles immediately prior to the accident along with the photos showing the aftermath of the accident. The user could then have the system automatically generate a variety of different synthetic video scenarios that would simulate the motions of the cars in the period between when the initial video was captured and the final state shown in the photograph.

The user could identify a subset of synthetic video scenarios that are (separately) consistent with each driver's scenario. The synthetic video scenarios could then be compared with one another to evaluate the most plausible scenario for what happened during the accident, which could help in establishing liability. Alternatively, the various synthetic video scenarios could be shown to the drivers and/or witnesses to help in clarifying the various accounts. In some cases where one driver has given a false account of the accident, the synthetic video scenarios can be used to identify the implausibility of the driver's account, by showing that there are no plausible scenarios consistent with the driver's account of the facts.

In the context of insurance providers, the system could be used to help insurance adjusters identify liability and instances of potential fraud. Moreover, an insurance provider could leverage the exemplary system at scale by utilizing an architecture where the system can generate and then autonomously evaluate synthetic video scenarios. Thus, rather than having adjusters interact with the system on a case-by-case basis, the system could automatically retrieve information for new claims (including video data and non-video data) and automatically generate and evaluate synthetic video scenarios for each claim. In such a use case, the system could provide a preliminary filter for identifying cases with obvious liability outcomes and/or to identify situations where fraud may be occurring.

It may be understood that the embodiments are not limited to a specific use case, and that the systems and methods may be applicable for any situation where video data is available for use in building synthetic video scenarios.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for generating and evaluating synthetic video scenarios based on captured video, the method comprising:
   receiving captured video information including a first video segment and a second video segment with a gap between the first video segment and the second video segment in which no captured video is available;
   receiving a set of scenario settings; and
   generating synthetic video scenarios using the received captured video information and using the set of scenario settings, each of the generated synthetic video scenarios including a segment of video that fills in the gap between the first video segment and the second video segment;
   wherein generating synthetic video scenarios includes generating one or more implausible synthetic video scenarios and identifying the generated implausible synthetic video scenarios as being implausible.

2. The method according to claim 1, wherein the method further includes automatically evaluating, with a synthetic video scenario evaluator, the synthetic video scenarios.

3. The method according to claim 1, wherein receiving the set of scenario settings includes receiving setting information from a scenario dashboard that is accessible to a user.

4. The method according to claim 1, wherein generating the synthetic video scenarios comprises using an autoencoder.

5. The method according to claim 1, wherein generating the synthetic video scenarios comprises using a generative adversarial network.

6. The method according to claim 1, wherein the method further includes:
   retrieving location information from the video information;
   providing guided instructions for a user to capture additional video at a location associated with the location information; and
   using the additional video to generate the synthetic video scenarios.

7. A non-transitory computer-readable medium storing software comprising instructions that are executable by one or more device processors to generate and evaluate synthetic video scenarios based on captured video by:
   receiving captured video information including a first video segment and a second video segment with a gap between the first video segment and the second video segment in which no captured video is available;
   receiving a set of scenario settings; and
   generating synthetic video scenarios using the received captured video information and using the set of scenario settings, each of the generated synthetic video scenarios including a segment of video that fills in the gap between the first video segment and the second video segment;
   wherein generating synthetic video scenarios includes generating one or more implausible synthetic video scenarios and identifying the generated implausible synthetic video scenarios as being implausible.

8. The non-transitory computer-readable medium storing instructions according to claim 7, wherein the instructions are further executable to automatically evaluate, with a synthetic video scenario evaluator, the synthetic video scenarios.

9. The non-transitory computer-readable medium storing instructions according to claim 7, wherein receiving the set of scenario settings includes receiving setting information from a scenario dashboard that is accessible to a user.

10. The non-transitory computer-readable medium storing instructions according to claim 7, wherein generating the synthetic video scenarios comprises using an autoencoder.

11. The non-transitory computer-readable medium storing instructions according to claim 7, wherein generating the synthetic video scenarios comprises using a generative adversarial network.

12. The non-transitory computer-readable medium storing instructions according to claim 7, wherein the instructions are further executable to:
   retrieve location information from the video information;
   provide guided instructions for a user to capture additional video at a location associated with the location information; and
   use the additional video to generate the synthetic video scenarios.

13. A system for generating and evaluating synthetic video scenarios based on captured video, the system comprising:
   a device processor; and
   a non-transitory computer readable medium storing instructions that are executable by the device processor to:
   receive captured video information including a first video segment and a second video segment with a gap between the first video segment and the second video segment in which no captured video is available;
   receive a set of scenario settings; and
   generate synthetic video scenarios using the received captured video information and using the set of scenario settings, each of the generated synthetic video scenarios including a segment of video that fills in the gap between the first video segment and the second video segment;
   wherein the system includes a preliminary filter for identifying scenarios where there is obvious liability or fraud; and
   wherein generating synthetic video scenarios includes generating one or more implausible synthetic video scenarios and identifying the generated implausible synthetic video scenarios as being implausible.

14. The system according to claim 13, wherein the instructions are further executable to automatically evaluate, with a synthetic video scenario evaluator, the synthetic video scenarios.

15. The system according to claim 13, wherein the instructions are further executable to receive setting information from a scenario dashboard that is accessible to a user.

16. The system according to claim 13, wherein the instructions are further executable to generate the synthetic video scenarios using an autoencoder.

17. The system according to claim 13, wherein the instructions are further executable to generate the synthetic video scenarios using a generative adversarial network.

18. The system according to claim 13, wherein the instructions are further executable to:
   retrieve location information from the video information;

provide guided instructions for a user to capture additional video at a location associated with the location information; and use the additional video to generate the synthetic video scenarios.

19. The system according to claim 13, wherein the set of scenario settings includes two or more selected scenes.

20. The system according to claim 19, wherein the set of scenario settings includes a time between the two or more selected scenes.

* * * * *